(12) United States Patent
Keegan

(10) Patent No.: US 6,737,182 B2
(45) Date of Patent: May 18, 2004

(54) HEATED INTERCONNECT

(75) Inventor: Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 235 days.

(21) Appl. No.: 09/884,527

(22) Filed: Jun. 18, 2001

(65) Prior Publication Data

US 2003/0003339 A1 Jan. 2, 2003

(51) Int. Cl.[7] ............ H01M 8/12; H01M 8/04; H01M 8/24
(52) U.S. Cl. ............ 429/13; 429/26; 429/32; 429/34
(58) Field of Search .............. 429/13, 26, 30, 429/32, 34

(56) References Cited

U.S. PATENT DOCUMENTS 4,883,497 A * 11/1989 Claar et al. ............... 29/623.5
5,641,585 A * 6/1997 Lessing et al. ............ 429/26
2002/0004155 A1 * 1/2002 Haltiner et al. ............ 429/30

FOREIGN PATENT DOCUMENTS

JP 61-45569 * 3/1986
JP 8-268750 * 10/1996

OTHER PUBLICATIONS

Paul M. Fishbane et al., Physics for Scientists and Engineers, Extended Version: vol. II. Prentice–Hall, Inc. 1993, pp. 793–734 and 804–5.*

* cited by examiner

Primary Examiner—Randy Gulakowski
Assistant Examiner—Jonathan Crepeau
(74) Attorney, Agent, or Firm—Jimmy L. Funke

(57) ABSTRACT

A solid oxide fuel cell stack is disclosed. The solid oxide fuel cell stack comprises an electrochemical cell having an electrolyte disposed between and in ionic communication with a first electrode and a second electrode. The solid oxide fuel cell stack also comprises at least one interconnect disposed in fluid and thermal communication with at least a portion of the electrochemical cell, the interconnect comprising an electrical supply connector.

25 Claims, 3 Drawing Sheets

HEATED INTERCONNECT

BACKGROUND

A fuel cell is an energy conversion device that converts chemical energy into electrical energy. The fuel cell generates electricity and heat by electrochemically combining a fluid fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A solid oxide fuel cell (SOFC) is constructed entirely of solid-state materials, utilizing an ion conductive oxide ceramic as the electrolyte. A conventional electrochemical cell in a SOFC comprises an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity.

A SOFC stack operates at temperatures of about 600° C. to 1,200° C. Since the SOFC stack operates at high temperatures, it requires a large amount of time to heat up to efficient operating temperatures. In order to have a faster and more efficient startup, the SOFC stack can be pre-heated to reduce the time required to reach operating temperatures. However, the conventional methods of heating the SOFC do not evenly heat the SOFC stack. Conventional methods can include directing heated gases through the SOFC stack prior to startup. However, this method of pre-heating does not evenly heat the SOFC stack creating wide temperature gradients. The materials of the SOFC stack cannot handle the wide temperature gradients and thus, performance is hindered and damage to the SOFC stack can result.

SUMMARY

The drawbacks and disadvantages of the prior art are overcome by the heated thin interconnect.

A solid oxide fuel cell stack is disclosed. The solid oxide fuel cell stack comprises an electrochemical cell having an electrolyte disposed between and in ionic communication with a first electrode and a second electrode. The solid oxide fuel cell stack also comprises at least one interconnect disposed in fluid and thermal communication with at least a portion of the electrochemical cell, the interconnect comprising an electrical supply connector.

A solid oxide fuel cell stack is disclosed. The solid oxide fuel cell stack comprises an electrochemical cell having an electrolyte disposed between and in ionic communication with a first electrode and a second electrode. The solid oxide fuel cell stack also comprises at least one interconnect disposed in fluid and thermal communication with at least a portion of the electrochemical cell, the interconnect comprising an electrical supply connector. A power supply is disposed in electrical communication with the electrical supply connector.

A method for heating a solid oxide fuel cell stack includes comprising disposing at least one interconnect in physical contact with at least a portion of an electrochemical cell having an electrolyte disposed between, and in ionic communication with, a first electrode and a second electrode. The at least one interconnect is independently heated.

The above described and other features are exemplified by the following figures and detailed description.

BRIEF DESCRIPTION OF THE DRAWINGS

Referring now to the figures, wherein like elements are numbered alike in the figures.

DETAILED DESCRIPTION

A SOFC operates at high temperatures (generally from about 600° C. to about 1,200° C.) requiring durable materials that can conduct electrical energy at high temperatures. An interconnect can provide a SOFC stack with a surface area that heats up quickly from cold start (e.g., about −40° C. to about 30° C.) and radiates the thermal energy for use by the SOFC stack.

Different types of SOFC systems exist, including tubular and planar systems. These various systems operate with different cell configurations. Therefore, reference to a particular cell configuration and components for use within a particular cell configuration are intended to also represent similar components in other cell configurations where applicable.

Figure 1:
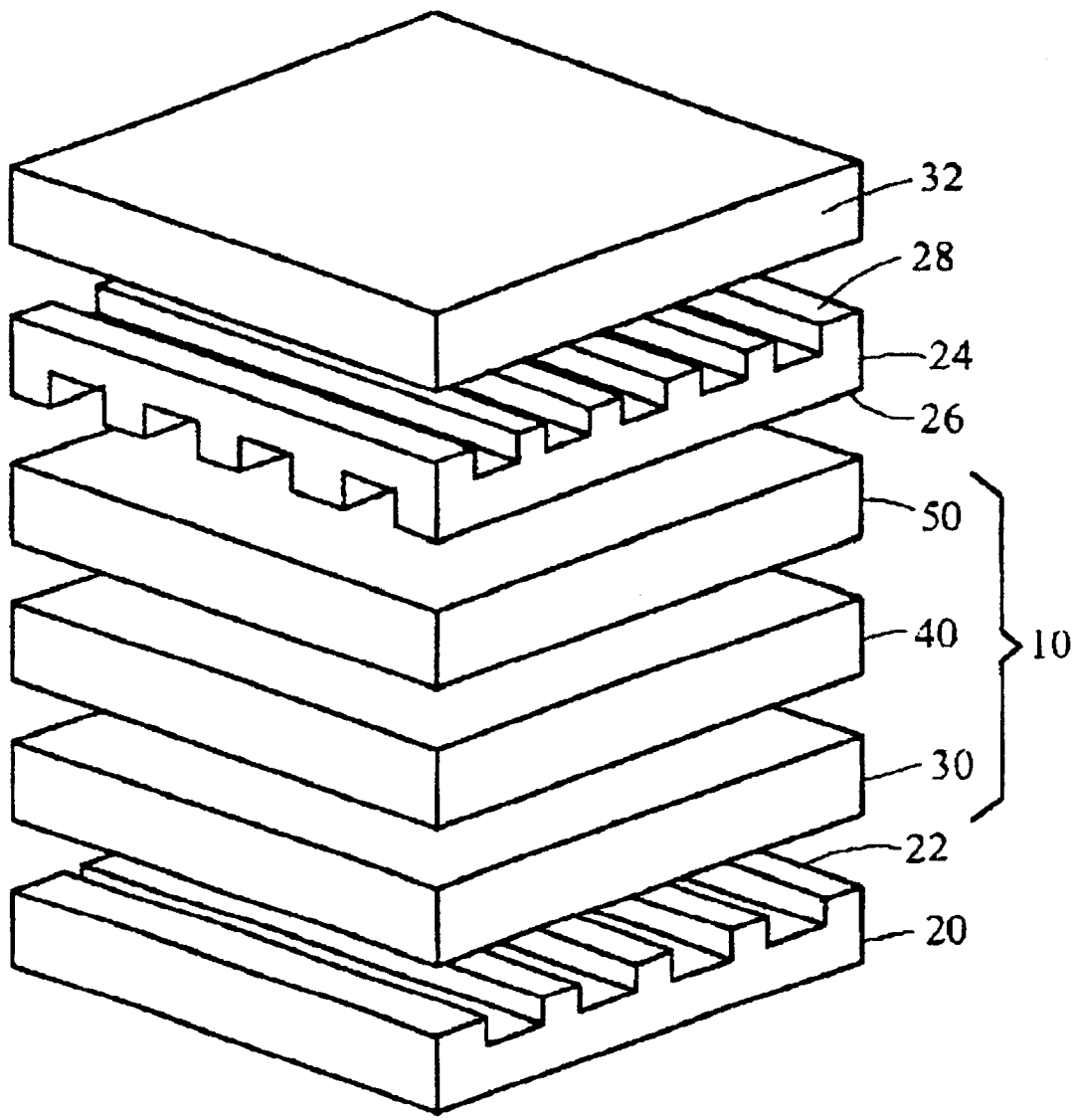
FIG. 1 is a view of a prior art single planar SOFC.

One configuration of a SOFC includes a stack of planar SOFCs. A single conventional SOFC is illustrated in FIG. 1. A fuel electrode (or anode) 30 and an oxygen electrode (or cathode) 50 are disposed on opposite sides of a solid electrolyte 40 to form an electrochemical cell 10. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to anode 32 of another electrochemical cell. Anode 32 is disposed adjacent to interconnect 24 to illustrate the placement of and ability to stack several electrochemical cells connected to electrochemical cell 10.

The solid electrolyte 40 of the electrochemical cell 10 can be an ion conductor capable of transporting oxygen ions from the cathode 50 to the anode 30, and which is compatible with the environment in which the SOFC will be utilized (e.g., temperatures of up to about 1,200° C.). Generally, solid electrolyte materials include materials, such as ceramics (e.g., perovskite, fluorite, and the like), metals (e.g., zirconium, yttrium, calcium, cerium, magnesium, aluminum, rare earths, and the like), as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+2}$ valence metal oxides). More preferably, a yttria-stabilized zirconia electrolyte is utilized in the SOFC.

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and to permit exit of the byproduct gases), with a porosity of up to about 40% useful, and about 20% to about 40% typically preferred.

The composition of the anode 30 and cathode 50 can comprise elements such as zirconium, yttrium, nickel, manganese, strontium, lanthanum, and oxides, alloys, and combinations comprising at least one of the foregoing elements. Preferably, the anode material is formed upon a ceramic skeleton, such as yttria-stabilized zirconia, for thermal compatibility.

Both the anode 30 and the cathode 50 can be formed on the electrolyte 40 by a variety of techniques including sputtering, chemical vapor deposition, screen printing, spraying, dipping, painting, and stenciling, among others. The electrodes are typically up to about 1,000 micrometers ($\mu$m) or so in thickness, with a thickness of about 10 $\mu$m to about 50 $\mu$m typically preferred. An anode supported cell can also be used by forming the electrolyte 40 and the cathode 50 on the anode 30 by any of the above techniques. Alternate constructions are also contemplated with the cathode 50 or an inert layer (not shown) substituted as the support for the electrochemical cell 10.

Each individual electrochemical cell 10 comprising a single anode 30, a single electrolyte 40, and a single cathode 50, generates a relatively small voltage as calculated using the Nerst equation of electrochemistry. This results in a voltage of less than about 1.2 volts direct current, with greater than about 0.5 volts preferred. A single electrochemical cell 10 can have a voltage output of less than or equal to about 1.2 volts, based upon the electrical load applied to the electrochemical cell 10. Higher system voltages are attained by electrically connecting a plurality of electrochemical cells in series to form a stack. The total number of cells forming a stack can range from 2 to several hundred, depending on power requirements, space and weight restrictions, economics, and the like.

Figure 2:
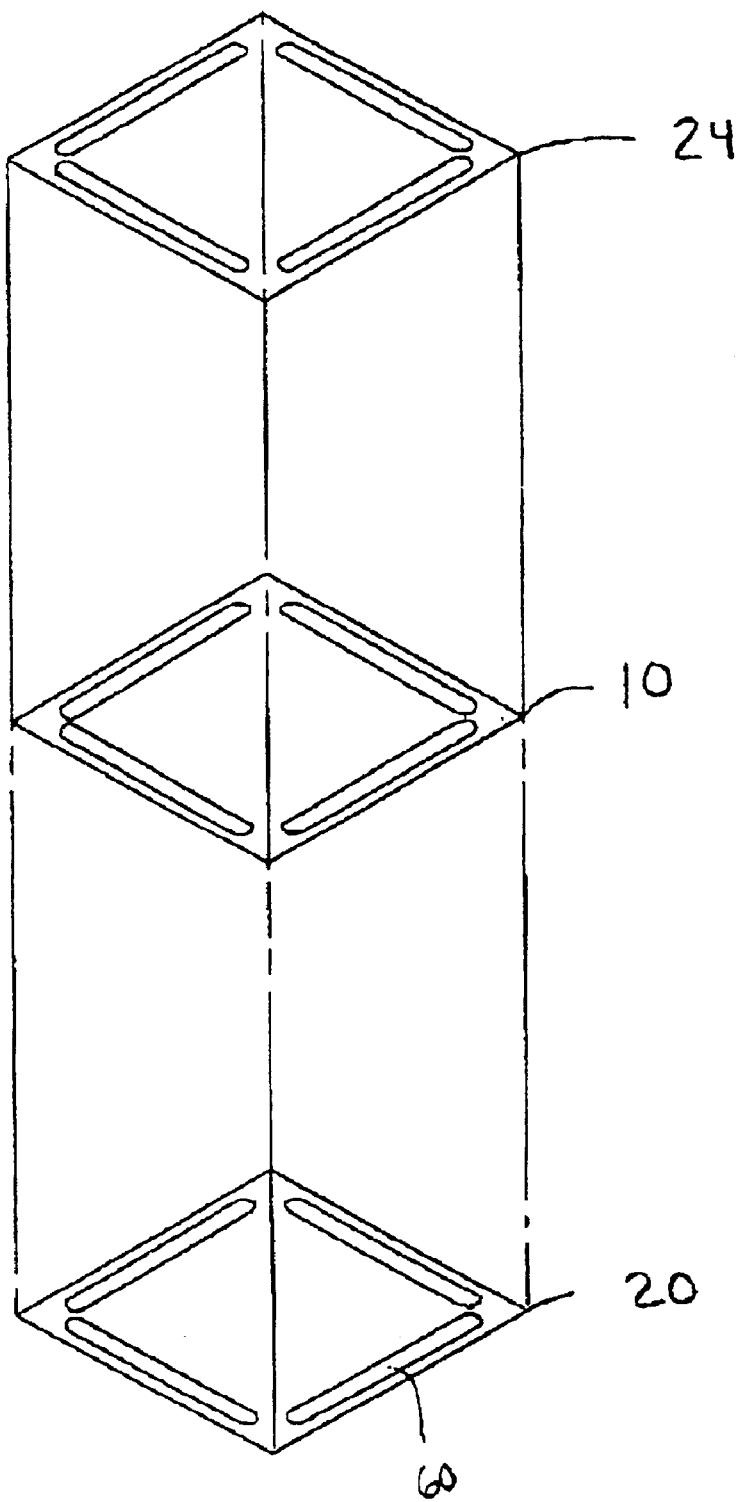
FIG. 2 is an illustration of a SOFC electrochemical cell and interconnects.

The electrochemical cell 10 can be electrically connected with other electrochemical cells using interconnects 20, 24. The interconnects 20, 24 are typically, but not limited to, a flat plate structure. Depending upon the geometry of the SOFC, the fuel and the oxidant flow to the anode or cathode (as appropriate) via the one or more passageways or flow sections (commonly referred to as manifolds) 60 that border the edge of the interconnect 20, 24, as illustrated in FIG. 2. The interconnects 20, 24 are preferably stable and electrically conductive at about 800° C. in a dual environment (e.g., an oxidizing atmosphere on one side and a reducing atmosphere on the other side).

Each interconnect 20, 24 can be an electrically conductive material that is compatible with the oxidizing or reducing nature of the fuel cell environment. For example, suitable interconnects can be ceramic, metallic, or the like, as well as composites, cermets, alloys, and combinations comprising at least one of the foregoing materials, in the form of plates, foils, felts, mats, fibers (chopped, woven, non-woven, long, and the like), and the like, and combinations comprising at least one of the foregoing forms. Preferably, the material is capable of withstanding transportation vehicle operating conditions (e.g., ambient temperatures of about −40° C. up to SOFC operating temperatures of up to about 1,200° C.). Some possible interconnects can comprise materials such as silver, copper, ferrous materials, strontium, lanthanum, chromium, chrome, gold, platinum, palladium, nickel, titanium, conducting ceramics (e.g., doped rare earth oxides of lanthanum, chromium, manganese, cobalt, nickel, and the like; doped zirconia, including, zirconia doped with titanium, copper, and the like), and the like, as well as alloys, oxides, cermets, composites, and combinations comprising at least one of the foregoing materials. Preferably, the interconnect 20, 24 comprise a ferrous material such as stainless steel, and the like.

An interconnect can serve as a heating element to provide for a uniform heating of the SOFC stack particularly from cold start. Heating one or more, preferably all of the interconnects can enable more uniform heating of the SOFC. However, interconnects with a thickness of about 1 millimeter (mm) or so, need a current of about 1,500 amperes per interconnect or so to sufficiently heat the SOFC (i.e., to heat to a temperature of about 700° C. in about 20 minutes). A thinner interconnect will increase the resistance of an interconnect, allowing for a reduction in the current for the same power. Additionally, a thinner interconnect will need less power to attain the same temperature in the same amount of time since there is less mass to heat. The interconnect can have a thickness up to about 1 mm or so, with a thickness of up to about 0.5 mm preferred, and up to about 0.05 mm even more preferred. Additionally, the interconnect should have a sufficient thickness to maintain the desired structural integrity and to provide the desired flow channels for the fuel and oxidant. Preferably, the interconnect has a thickness of greater than or equal to about 0.01 mm, with less than or equal to about 0.03 mm preferred.

For comparison, Table 1 presents the characteristics of applying a current to heat three SOFCs, each having 60 electrochemical cells. Three SOFCs trials were completed (A, B, and C), each having interconnects of varying thickness (1 mm, 0.1 mm, and 0.05 mm, respectively). In each trial, the interconnects: comprised steel; were 100 mm in length and 100 mm in width; and had a specific heat of 0.51 J/g-K, a resistivity of 0.15, and a density of 7.9 g/cm³. The time allowed to heat for each trial was 300 seconds.

TABLE 1

| Conditions | Trial A | Trial B | Trial C |
|---|---|---|---|
| Interconnect Specific Heat (Joules/gram-Kelvin) | 0.51 | 0.51 | 0.51 |
| Resistivity (Ohm mm²/mm) | 0.15 | 0.15 | 0.15 |
| Density (grams/cubic centimeters) | 7.9 | 7.9 | 7.9 |
| Thickness (mm) | 1 | 0.1 | 0.05 |
| Width (mm) | 100 | 100 | 100 |
| Length (mm) | 100 | 100 | 100 |
| Area (mm²) | 100 | 10 | 5 |
| Volume (mm³) | 10,000 | 1,000 | 500 |
| Interconnect mass (grams/cell) | 79 | 7.9 | 3.95 |
| Total Resistance from edge 1 to edge 2 (ohms/cell) | 0.15 | 1.5 | 3 |
| Delta T required (° C.) | 650 | 650 | 650 |
| Joules of Heating Required (Joules/cell) | 26,188.5 | 2,618.85 | 1,309.425 |
| Time allowed to heat (seconds) | 300 | 300 | 300 |
| Power Required to heat (watts/cell) | 87.295 | 8.7295 | 4.36475 |

TABLE 1-continued

| Conditions | Trial A | Trial B | Trial C |
|---|---|---|---|
| Power desired on interconnect (watts/cell) | 87.295 | 8.7295 | 4.36475 |
| Required current at given resistance (amperes/cell) | 24.12399 | 2.412399 | 1.206199 |
| Required Minimum voltage at given current and resistance (volts) | 3.618598 | 3.618598 | 3.618598 |
| Number of cells | 60 | 60 | 60 |
| Total current (amperes/stack) | 1,447.439 | 144.7439 | 72.37196 |
| Total Heating Power (watts/Stack) | 5,237.7 | 523.77 | 261.885 |

As Table 1 indicates, the thinner the interconnect, the greater the resistance, which allows for a reduced amount of current. For example, trial A has an interconnect having a thickness of 1 mm and a resistance of 0.15 ohms/cell, while trial C has an interconnect having a thickness of 0.05 mm and a resistance of 3 ohms/cell. This translates into a lesser amount of current being required for SOFC of Trial C, in comparison to the SOFC of Trial A, in order to heat the interconnect (1.2 amperes/cell (A/cell) vs. 24.1 A/cell). Preferably, the interconnect has a resistance of greater than or equal to about 1.2 ohms/cell, with greater than or equal to about 2 ohms/cell more preferred, and greater than or equal to about 3 ohms/cell even more preferred. Also preferred is a power to heat the interconnect of less than or equal to about 6 watts/cell, with less than or equal to about 5 watts/cell more preferred, and about less than or equal to about 4.5 watts/cell even more preferred.

In each of the trials, the total current was measured to determine the amperes required for the particular SOFC stack to operate the thin, heated interconnect. Less power (about 72.4 amperes/stack (A/stack)) was required for Trial C when compared to Trial B (about 144.7 A/stack) and Trial A (about 1,447.4 A/stack). Likewise, the total heating power of Trial C (about 261.8 watts/stack (W/stack)) was less when compared to Trial B (about 523.7 W/stack) and Trial A (about 5,237.7 W/stack). This indicates that a thinner (e.g., 0.05 mm) electrically heated interconnect requires less power to heat. Consequently, thinner interconnects are preferred.

Figure 3:
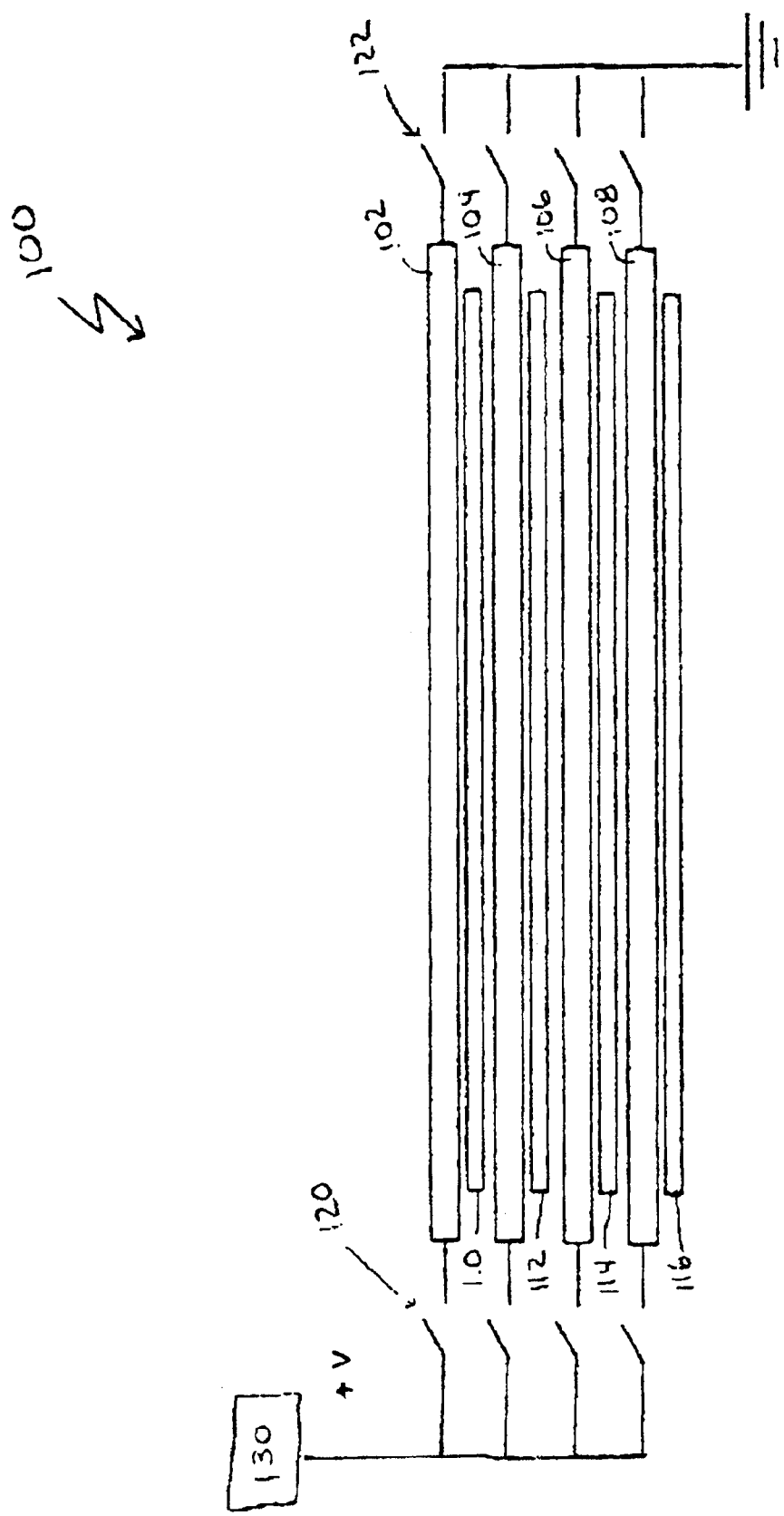
FIG. 3 is an SOFC stack incorporating a thin, heated interconnect.

The use of a heatable thin interconnect in a SOFC stack 100 is illustrated in FIG. 3. Electrochemical cells 110, 112, 114, 116 are separated by interconnects 102, 104, 106, 108. Several switches, as illustrated by representative switches 120, 122, can optionally be disposed, preferably in parallel in electrical communication with interconnects 102, 104, 106, 108. A power supply 130 can optionally provide electricity to interconnects 102, 104, 106, 108; e.g., via the use of a controller (not shown).

The power supply 130 can comprise any available electrical power source. Some possible sources include stored energy in the vehicle (e.g., a battery, or the like), a vehicle power source (e.g., power from the vehicle alternator (when running)), a connection to an external energy source (e.g., off vehicle battery or other electrical supply (e.g., power grid), and the like), as well as combinations comprising at least one of the foregoing power sources.

The power supply 130 provides power to the interconnects 102, 104, 106, 108 independently heating each interconnect. Preferably, each interconnect is heated to a temperature of greater than or equal to about 600° C., with greater than or equal to 700° C. preferred. Preferably, each interconnect is heated to a temperature of less than or equal to about 800° C., with less than or equal to about 775° C. more preferred. Essentially, the interconnect acts as a heating element to heat up each electrochemical cell to a desired temperature to allow for startup of the SOFC stack. Preferably, the interconnect is heated to a sufficient temperature to heat the SOFC to a temperature of greater than or equal to about 700° C. in less than or equal to about 20 minutes, with greater than or equal to about 750° C. in less than or equal to about 10 minutes preferred.

The heating of each interconnect provides a more uniform heating of the SOFC stack. Consequently, although the interconnects can be controlled separately to enable heating of selected interconnects, preferably, all of the interconnects are heated simultaneously. The heating of interconnects can be controlled by the regulation of switches.

A method of using the heated interconnect involves supplying power to each interconnect. The electricity is distributed to the interconnects by a switch that controls the supply of electricity to the interconnect. Once the interconnect reaches a sufficient temperature, as defined above, the switch opens stopping the flow of electricity. Optionally, the switches can be controlled by a time schedule, based upon temperature sensors (at the interconnect and/or at the electrochemical cell), computer controlled, or "inherent" (e.g., PTC resistors, and the like). At this point, the SOFC stack is at a sufficient temperature to proceed to starting the SOFC system.

The heated interconnect provides a more uniform method of heating the mass of the SOFC stack. Disposing the interconnect between each SOFC electrochemical cell provides for blocking electrical communication between the cells, as well as providing a mechanism by which the SOFC stack can be heated to startup temperatures. The individual heating capability of the interconnect prevents wide temperature gradients across the SOFC stack commonly associated with other methods. Electrically heating the interconnect allows for rapid and uniform heating of the cell stack. Additionally, the thin interconnect requires less power to heat since there is less mass to heat.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid oxide fuel cell stack, comprising:
    an electrochemical cell having an electrolyte disposed between and in ionic communication with a first electrode and a second electrode; and
    at least one interconnect disposed in fluid and thermal communication with at least a portion of said electrochemical cell, said interconnect comprising an electrical supply connector, said interconnect configured to receive electrical energy to act as a heating element to heat said electrochemical cell to a desired temperature.

2. The solid oxide fuel cell stack of claim 1, wherein said interconnect comprises a material selected from the group comprising silver, copper, ferrous materials, strontium, lanthanum, chromium, chrome, gold, platinum, palladium, nickel, titanium, conducting ceramics, as well as alloys, oxides, cermets, composites, and combinations comprising at least one of the foregoing materials.

3. The solid oxide fuel cell stack of claim 1, wherein said interconnect has a thickness of less than or equal to about 1 mm.

4. The solid oxide fuel cell stack of claim 3, wherein said interconnect has a thickness of about 0.01 mm to about 0.1 mm.

5. The solid oxide fuel cell stack of claim 3, wherein said interconnect has a thickness of about 0.03 mm to about 0.05 mm.

6. The solid oxide fuel cell stack of claim 1, further comprising at least one switch disposed in electrical communication with said electrical connector.

7. The solid oxide fuel cell stack of claim 1, wherein said interconnect has a resistance of greater than or equal to about 1.2 ohms/cell.

8. The solid oxide fuel cell stack of claim 7, wherein said resistance is greater then or equal to about 2 ohms/cell.

9. The solid oxide fuel cell stack of claim 8, wherein said resistance is greater than or equal to about 3 ohms/cell.

10. The solid oxide fuel cell stack of claim 1, wherein a power to heat said interconnect is less than or equal to about 6 watts/cell.

11. The solid oxide fuel cell stack of claim 10, wherein said power is less than or equal to about 5 watts/cell.

12. The solid oxide fuel cell stack of claim 11, wherein said power is less than or equal to about 4.5 watts/cell.

13. A solid oxide fuel cell stack system, comprising:
an electrochemical cell having an electrolyte disposed between and in ionic communication with a first electrode and a second electrode;
at least one interconnect disposed in fluid and thermal communication with at least a portion of said electrochemical cell, said interconnect comprising an electrical supply connector, said interconnect configured to receive electrical energy to act as a heating element to heat said electrochemical cell to a desired temperature; and
a power supply disposed in electrical communication with said electrical supply connector.

14. The solid oxide fuel cell stack of claim 13, wherein said interconnect comprises a material selected from the group comprising silver, copper, ferrous materials, strontium, lanthanum, chromium, chrome, gold, platinum, palladium, nickel, titanium, conducting ceramics, as well as alloys, oxides, cermets, composites, and combinations comprising at least one of the foregoing materials.

15. The solid oxide fuel cell stack system of claim 13, wherein said power supply is selected from the group consisting of a battery, an alternator, and combinations comprising at least one of the foregoing power supplies.

16. The solid oxide fuel cell stack system of claim 13, wherein said electrical supply connector further comprising a control switch.

17. A method for heating a solid oxide fuel cell stack, comprising:
supplying electrical power to an interconnect of an electrochemical cell stack, said electrochemical cell stack comprising electrochemical cells each having en electrolyte disposed between and in ionic communication with a first electrode and a second electrode, and said interconnect disposed between adjacent electrochemical cells and in fluid and thermal communication with at least a portion of said electrochemical cell, and said interconnect comprising an electrical supply connector, said interconnect configured to receive electrical energy to act as a heating element to heat said electrochemical cell to a desired temperature.

18. The method of claim 17, wherein said interconnect has a thickness of less than about 1 mm.

19. The method of claim 17, wherein said interconnect has a thickness of less than about 0.1 mm.

20. The method of claim 17, wherein said interconnect has a thickness of less than about 0.05 mm.

21. The method of claim 17, wherein said heating said interconnect is by converting electrical energy to thermal energy.

22. The method of claim 17, further comprising simultaneously supplying electrical power to all of said interconnects.

23. The method of claim 17, stopping the supply of electrical power to said interconnect when said interconnect attains a temperature of greater than or equal to about 600° C.

24. The method of claim 23, wherein said temperature is greater than or equal to about 700° C.

25. The method of claim 24, wherein said temperature is greater than or equal to about 700° C. in a period of less than or equal to about 20 minutes.

* * * * *